United States Patent
Bonanni et al.

(10) Patent No.: US 9,247,387 B2
(45) Date of Patent: Jan. 26, 2016

(54) PROXIMITY BASED REMINDERS

(71) Applicant: International Business Machines Corporation, Armonk, NY (US)

(72) Inventors: Cristina Bonanni, Rome (IT); Paola Carlesimo, Rome (IT); Giovanni B. P. Catasta, Rome (IT); Giuseppe Longobardi, Castellammare di Stabia (IT); Alessandra Rotunno, Rome (IT)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 13/675,926

(22) Filed: Nov. 13, 2012

(65) Prior Publication Data
US 2014/0135036 A1    May 15, 2014

(51) Int. Cl.
H04W 4/02 (2009.01)
H04W 4/00 (2009.01)

(52) U.S. Cl.
CPC .............. H04W 4/023 (2013.01); *H04W 4/008* (2013.01)

(58) Field of Classification Search
CPC .............................. H04W 4/023; H04W 4/088
USPC .......... 455/404.2, 456.3, 456.1, 456.2, 456.5, 455/456.6, 457, 440, 412.2
See application file for complete search history.

(56) References Cited

U.S. PATENT DOCUMENTS

| | | | |
|---|---|---|---|
| 1,685,582 A1 | 3/2006 | Eaton et al. | |
| 7,363,044 B2 * | 4/2008 | Korneluk | G01S 19/252 455/456.1 |
| 7,541,940 B2 | 6/2009 | Upton | |
| 7,848,765 B2 | 12/2010 | Phillips et al. | |
| 7,933,612 B2 | 4/2011 | Counts et al. | |
| 8,054,180 B1 | 11/2011 | Scofield et al. | |
| 8,428,561 B1 * | 4/2013 | Vance | H04W 4/206 455/412.1 |
| 8,730,872 B2 * | 5/2014 | Elmaleh | H04W 4/023 370/328 |
| 2002/0067308 A1 * | 6/2002 | Robertson | G01C 21/00 342/357.395 |
| 2003/0224762 A1 * | 12/2003 | Lau | G06Q 10/109 455/412.2 |
| 2004/0176107 A1 * | 9/2004 | Chadha | H04W 4/02 455/456.5 |
| 2004/0203847 A1 * | 10/2004 | Knauerhase | G06Q 10/06 455/456.1 |

(Continued)

FOREIGN PATENT DOCUMENTS

GB    2481609 A    1/2012

OTHER PUBLICATIONS

"Proximity Sensing of Objects and People Using Senix Non-Contact Ultrasonic Sensors", http://www.senix.com/apps_proximity.htm, accessed on Aug. 22, 2012, 1 page.

(Continued)

*Primary Examiner* — Mehmood B Khan
(74) *Attorney, Agent, or Firm* — Stephen J. Walder, Jr.; Joseph PetroKaitis

(57) ABSTRACT

Mechanisms, in a data processing system, for generating a reminder notification are provided. The physical presence of another device within a physical local range of a wireless communication device is detected. An identity associated with the other device is determined and a determination is made as to whether a reminder record is stored in association with the identity associated with the other device. In response to a reminder record being stored in association with the identity associated with the other device, a reminder notification is generated and output on the wireless communication device based on content of the reminder record.

22 Claims, 5 Drawing Sheets

(56) References Cited

U.S. PATENT DOCUMENTS

| | | | |
|---|---|---|---|
| 2005/0144318 A1* | 6/2005 | Chang | G06F 1/3203 709/245 |
| 2005/0250552 A1* | 11/2005 | Eagle | H04M 1/7253 455/567 |
| 2005/0273493 A1 | 12/2005 | Buford et al. | |
| 2006/0225076 A1 | 10/2006 | Longobardi | |
| 2007/0005363 A1* | 1/2007 | Cucerzan | H04W 4/02 704/256 |
| 2007/0149214 A1* | 6/2007 | Walsh | H04L 12/1859 455/456.1 |
| 2007/0198281 A1* | 8/2007 | Abernethy, Jr. | G06Q 10/109 709/204 |
| 2008/0070593 A1* | 3/2008 | Altman | H04L 63/102 455/457 |
| 2008/0148360 A1* | 6/2008 | Karstens | H04L 63/10 726/4 |
| 2008/0182591 A1* | 7/2008 | Krikorian | H04W 68/00 455/456.3 |
| 2008/0186196 A1* | 8/2008 | Lessing | G06Q 10/109 340/686.6 |
| 2008/0301567 A1 | 12/2008 | Martin et al. | |
| 2009/0233629 A1* | 9/2009 | Jayanthi | H04L 12/5865 455/457 |
| 2010/0093371 A1* | 4/2010 | Gehrke | H04W 4/02 455/456.2 |
| 2010/0295676 A1 | 11/2010 | Khachaturov et al. | |
| 2012/0003931 A1* | 1/2012 | Eisinger | H04W 48/08 455/41.2 |
| 2012/0172062 A1* | 7/2012 | Altman | G06Q 30/0207 455/457 |
| 2012/0179547 A1* | 7/2012 | Besore | G06Q 30/0261 705/14.58 |
| 2012/0214442 A1* | 8/2012 | Crawford | H04W 12/06 455/411 |
| 2013/0130726 A1* | 5/2013 | Deng | H04M 1/72572 455/457 |
| 2013/0185368 A1* | 7/2013 | Nordstrom | H04L 51/32 709/206 |
| 2013/0203442 A1* | 8/2013 | LeBlanc | G06Q 10/109 455/456.3 |
| 2013/0244690 A1* | 9/2013 | Huang | G06Q 10/06 455/456.1 |
| 2013/0267253 A1* | 10/2013 | Case | H04W 4/021 455/456.3 |
| 2013/0281128 A1* | 10/2013 | Singh | G06Q 10/109 455/456.3 |
| 2014/0066104 A1* | 3/2014 | Alfaro | G06T 11/60 455/456.3 |
| 2014/0155097 A1* | 6/2014 | Tucker | H04W 4/021 455/456.3 |

OTHER PUBLICATIONS

Borriello, Gaetano et al., "Reminding about Tagged Objects using Passive RFIDs", Lecture Notes in Computer Science, vol. 3205/2004, 2004, pp. 36-53.

Ludford, Pamela J. et al., "Capturing, Sharing, and Using Local Place Information", CHI 2007 Proceedings, Location Aware Systems, Proceedings of the SIGCHI Conference on Human Factors in Computing Systems, Apr. 28-May 3, 2007, pp. 1235-1244.

Quercia, Daniele et al., "FriendSensing: Recommending Friends Using Mobile Phones", RecSys'09, Oct. 23-25, 2009, pp. 273-276.

Sohn, Timothy et al., "Place-Its: A Study of Location-Based Reminders on Mobile Phones", M. Beigl et al. (Eds): UbiComp 2005, LNCS 3660, 2005, pp. 232-250.

* cited by examiner

PROXIMITY BASED REMINDERS

BACKGROUND

The present application relates generally to an improved data processing apparatus and method and more specifically to mechanisms for providing proximity based reminders.

Wireless communication devices, such as cellular telephones, smart phones, tablet computing devices, notebook computing devices, and the like, typically include the capability to store and execute calendar programs and to generate alert messages on the wireless communication device based on a current day/time and the events associated with that day/time in the calendar program. Such wireless communication devices further provide electronic agenda and notepad applications as well. While these applications provide the ability to generate alert notifications to a user of the wireless communication device, these alert notifications are tied to day/time criteria.

SUMMARY

In one illustrative embodiment, a method in a data processing system, for generating a reminder notification. The method comprises detecting the physical presence of another device within a physical local range of a wireless communication device. The method further comprises determining an identity associated with the other device and determining if a reminder record is stored in association with the identity associated with the other device. The method also comprises, in response to a reminder record being stored in association with the identity associated with the other device, generating and output a reminder notification on the wireless communication device based on content of the reminder record.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
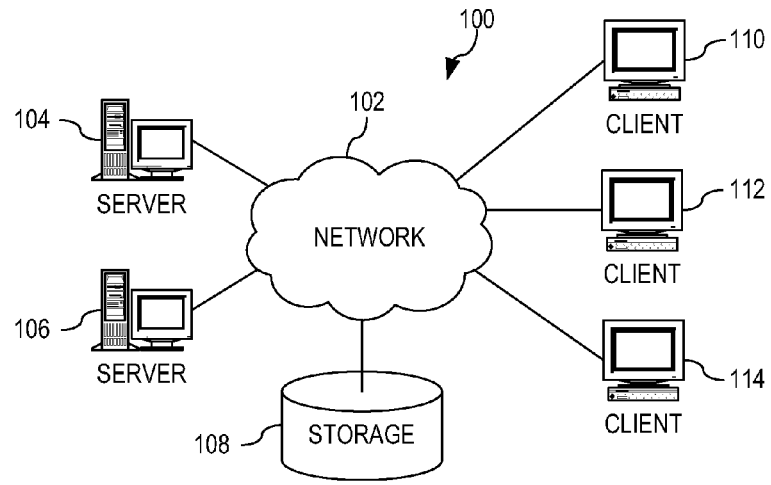
FIG. 1 is an example diagram of a distributed data processing system in which aspects of the illustrative embodiments may be implemented.

Many times, individuals wish to have reminders linked to a specific person rather than only to a particular day/time. For example, a person may wish to have a reminder to return a book or other borrowed item, pay money to, relate a story to, discuss a particular topic, or perform some other action when the person is next in close proximity to another identified person. However, often times, one does not recall what they intended to do with regard to the other person until after the encounter with the other person. Wireless communication devices today do not provide any assistance in this regard since their alert notifications are tied to day/time and not to proximity with other persons for which alert notifications are desired to be received.

The illustrative embodiments provide mechanisms for proximity based reminders. More specifically, the illustrative embodiments provide mechanisms in a first wireless communication device and/or wireless communication system for detecting the presence of a second wireless communication device associated with a contact entry with which a reminder is set in the first wireless communication device. In response to detecting the presence of the second wireless communication device in proximity to the first wireless communication device, a reminder notification may be output on the first wireless communication device and/or a message may be transmitted from the first wireless communication device to the second wireless communication device.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
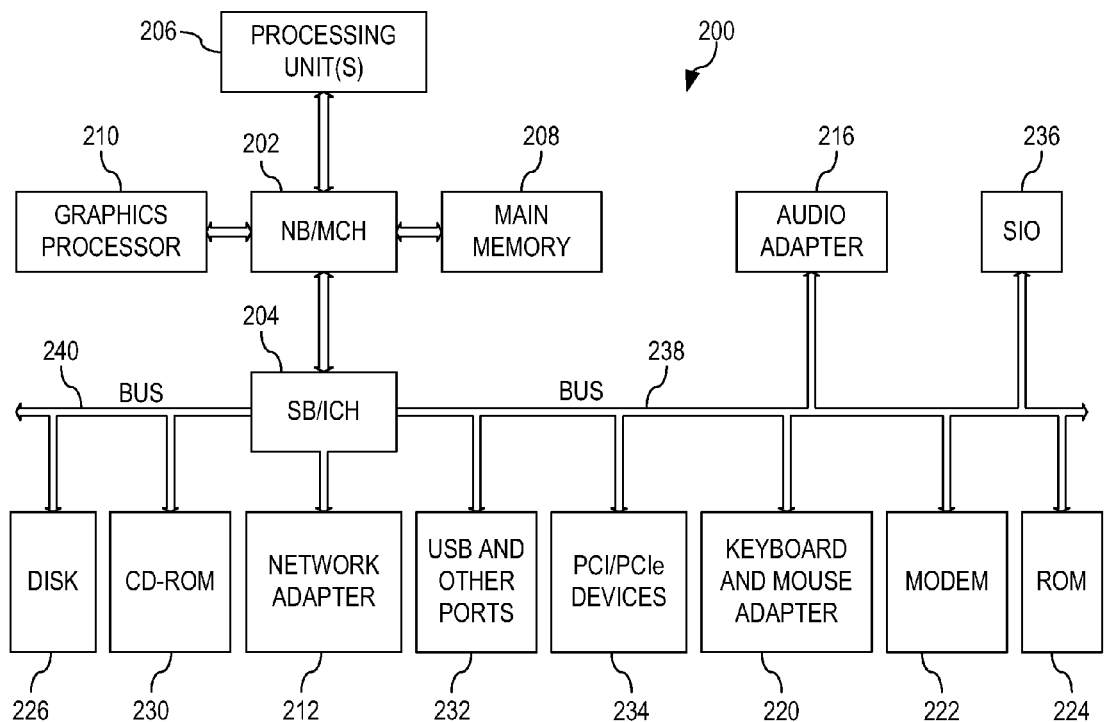
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Referring again to FIG. 1, in one illustrative embodiment, one or more of the client devices 110-114 are mobile communication devices, such as smart phones, tablet computing devices, notebook computers, or the like, equipped with applications for maintaining electronic calendars, contact lists, notes, and the like. The mobile communication devices 110-114 may communicate with one another and with servers 104, 106 via one or more networks 102 which may comprise one or more wireless networks, such as a cellular networks, 3G or 4G wireless communication networks, or the like. These wireless networks may be coupled to one or more wired telecommunication and/or data communication networks, such as landline telephone networks, the Internet, or the like. The mobile communication devices 110-114 may also comprise hardware/software for performing short distance communications between devices within a localized area. Such short distance communications may be, for example, a Bluetooth based communication, infrared communication, WiFi or radio frequency based communications, ultra-frequency sound based communication, radio frequency identifier (RFID) based communications, or the like. These short distance communications mechanisms may be utilized, as described hereafter, to determine the other mobile communication devices 110-114 that are within a localized vicinity of a user's mobile communication device. Alternatively, other more centralized mechanisms that operate based on global positioning systems, cellular triangulation, or the like, may be used to determine what mobile communication devices are located within a localized vicinity of the user's mobile communication device.

With the mechanisms of the illustrative embodiments, a user of a mobile communication device 110, hereafter referred to as smart phone 110 to take one example of a mobile communication device, may interact with a reminder engine of the smart phone 110, which is associated with the contact list application and may be associated with one or more of an electronic calendar application, a notes application, and the like, to create a reminder note or reminder record that is associated with the contact entry in the contact list application. The reminder record created by the reminder engine is a reminder associated with the person or user corresponding to the contact entry, rather than being associated with a particular day/time, for example. The reminder record preferably identifies the particular contact entry with which it is associated and specifies the characteristics and/or content of the reminder that is to be generated when the user or person associated with the contact entry is determined to be within a local proximity of the smart phone 110. Such reminder characteristics may indicate the type of reminder to generate, e.g., textual, graphical, audible, tactile, or a combination of these as well as other characteristics including frequency of repetition, volume levels, a designation of audible sound or audible output to generate (such as a particular alert sound, music, or the like), and any of a plurality of other possible characteristics. The content of the reminder may be the textual message to output, whether to output a picture of the user with which the reminder is associated, whether to send a text message to the other user's smart phone 110, or the like.

The reminder record that is generated through the reminder engine is associated with a particular contact entry in a contact list database stored on the smart phone 110 or in a centralized server and which is associated with the smart phone 110. For example, the reminder engine may be integrated with, or have an interface to, the contact list application such that a user may select a contact entry from the contact list database associated with the contact list application and be presented with a user selectable option and corresponding user interface for specifying reminder to be generated when the user of the smart phone 110 is within a close proximity to the person associated with the contact entry.

As is generally known in the art, a contact list application that may be executed on the smart phone 110 may provide user interfaces for inputting and outputting information regarding various other users with which communication may be performed. This contact list application may be associated with other communication applications, such as an electronic mail application, an automatic dial application, or the like, on the mobile communication device. The specific contact records maintained in a contacts database associated with the contact list application may store various information regarding users including name, address, telephone number, mobile telephone number, electronic mail address, notes regarding the user, and the like. The contact entry provides both an identifier of the person with which the contact entry is associated and an identifier of the mobile communication device(s), e.g., smart phone, notebook computer, etc., that are associated with the person associated with the contact entry. This information, such as International Mobile Equipment Identity (IMEI), phone-number, Bluetooth id, WIFI id, device MAC address, or the like, may be used to identify whether the person is within a localized proximity of the smart phone 110 or not. The contact entry further provides contact information that may be used to send notifications to the person associated with the contact entry if desired by the user of the smart phone 110 as part of the reminder notification, as will be described hereafter.

The reminder engine of the smart phone 110 is further responsible for checking reminder records associated with the reminder engine to determine if reminder notifications are to be output and/or transmitted to other devices, such as smart phone 112. The checking of reminder records may be initiated, for example, in response to detecting the presence of one or more other devices within a local proximity of the smart phone 110, or the determination that the smart phone 110 is within a particular range of location information for one or more contacts, as discussed hereafter. The identifier of the detected device may be compared against identifiers of devices associated with contact records in the contacts database to identify any matches and then retrieve any corresponding reminder records. Alternatively, a search of reminder records based on a current geographical location of the smart phone 110 can be periodically performed to determine if corresponding contact information has location information that is within a given range of the present position of the smart phone 110.

To better illustrate the overall operation of the illustrative embodiments, consider a scenario in which a user of smart phone 110 has generated a reminder record associated with a contact record of a person using smart phone 112. When devices are within a local proximity of the smart phone 110, the local proximity being either defined by the limits of the local communication mechanisms, e.g., Bluetooth or the like, or being specified by a user configurable setting in the smart phone 110 or centralized server 104, for example, the identity of the devices is compared to the contact list database associated with the smart phone 110 to determine if there is a matching contact entry for the identity of the devices. For example, the identity of another smart phone, such as smart phone 112, may be the telephone number, device id (e.g., Bluetooth id or WiFi id) MAC address, IMEI, or the like, associated with the smart phone 112. This telephone number of device id may be communicated to the smart phone 110 via the local communication mechanism or by a centralized server 104 (which may know the position of the smart phone 112 based on periodic wireless heartbeat transmissions with the wireless network 102, or other transmissions informing the wireless network 102 of the presence of the smart phone 112 as is generally known in the art).

The telephone number or device id may be used to perform a lookup operation in the contact list database to determine if there is a contact entry corresponding to the telephone number or device id. If a matching contact entry is found, then a lookup operation may be performed by the reminder engine to determine if there are any reminder records associated with the matching contact entry. If so, then the reminder record is retrieved and an appropriate reminder notification is output based on the settings for the reminder notification specified in the reminder record. This reminder notification may not only comprise a reminder notification output using the smart phone 110, but may also include the transmission of a message to the other smart phone 112 associated with the person identified in the matching contact entry.

In response to the reminder notification being output on the smart phone 110, options may be provided to the user of the smart phone 110 to respond to the output of the reminder notification. These response options may include an "OK"

option which causes the smart phone 110 to store an indicator that the reminder notification has been acknowledged with no further action to be performed, a "Snooze" option which removes the reminder notification but sets a parameter to cause the reminder notification to be represented after the elapse of a given interval of time, and/or a "Postpone" option which causes the reminder notification to be removed with an indication that the reminder notification should be output again at a next time that the other smart phone 112 is again detected within a local vicinity of the smart phone 110.

In one illustrative embodiment in which reminder notifications can cause messages to be transmitted to the other smart phone 112 in response to determining that the conditions of the reminder record are met, before outputting the message to the other smart phone, a user interface may be presented to the user of the smart phone 110 with which the reminder record is associated. The user interface may provide the user of the smart phone 110 with options for enabling or disabling the sending of the message to the other smart phone 112. This may be useful, for example, when the "Snooze" or "Postpone" option is selected by the user and may be automatically implemented in response to the selection of the "Snooze" or "Postpone" option.

In one illustrative embodiment, the reminder engine may be integrated with, or may have an interface to, an electronic calendar application of the smart phone 110. As such, one of the options that may be set within the reminder record is to link the reminder record to a particular calendar entry in the electronic calendar application. Thus, when the reminder notification is generated and output, the content of the reminder notification may be retrieved from the corresponding calendar entry and used to populate the content of the reminder notification, e.g., a reminder notification of "There is a meeting with Bill at 12:15pm tomorrow in Room 215." Moreover, if the reminder notification has been configured to transmit a message to the other party, e.g., smart phone 112 in this example scenario, the message that is transmitted to the other party may have content that is also populated based on the retrieved calendar entry. As an example, if the reminder is to remind the other party of a meeting that is scheduled for the next day, in response to the smart phone 112 being within a local vicinity of smart phone 110, smart phone 110 may transmit a message to smart phone 112 using the mechanisms of the illustrative embodiments that essentially says, "Hey Bill, don't forget about the meeting scheduled for 12:15pm tomorrow in Room 215." While these reminders obtain information from the scheduled events in the electronic calendar application, it is important to note that the output and/or transmission of the reminder messages is not based on the time/date of the event in the electronic calendar but instead upon the reminder record and the proximity of the wireless communication devices 110 and 112 with each other indicating close proximity of the users of these wireless communication devices 110 and 112.

The determination of what devices are nearby the smart phone 110 may be performed locally by the smart phone 110 or using a more centralized approach through a centralized server, such as server 104 or 106, for example. With a centralized approach, various mechanisms may be used to identify the locations of the wireless communication devices (e.g., smart phones) 110 and 112 including using global positioning systems (GPS), radio frequency identifier (RFID) tag based mechanisms, cellular triangulation, GSM data, WiFi hotspots, or the like. For example, GPS mechanisms in the smart phones 110 and 112 may be used to report their position to the centralized server 104 which may then determine what devices are within a predetermined geographical distance of each other. The predetermined geographical distance may be a default geographical distance or may be specific to the particular reminder records associated with the smart phone 110 in a case where the reminder records are stored at, or otherwise accessible by, the centralized server 104. For example, the default geographical distance may be selected to be a distance that is sufficiently large enough to encompass most reminder records but not too large as to be overly encompassing, e.g., a 5 mile radius.

Moreover, in a centralized server approach, rather than the reminder engine being present on the wireless communication devices themselves, the reminder engine may instead be present on the centralized server, e.g., server 104. In such a case, the centralized server may store the reminder records in association with a wireless communication device with which they are associated and may further store a copy of the contact information of the wireless communication device with which the reminder records are associated, or at least the contact list records with which reminder records are associated. In such an embodiment, the functionality of the reminder engine is performed within the centralized server with the resulting reminder output being transmitted to the wireless communication device, e.g., smart phone 110 in the above scenario. Inputs from the wireless communication device may be received back indicating the user's selection of one of the acknowledgement inputs, e.g., "OK", "Snooze", or "Postpone." The centralized server may also transmit the messages associated with reminder records to the other wireless communication devices in response to a reminder being triggered on the first wireless communication device.

It should be appreciated that while the above description is based on the proximity of two or more wireless communication devices to each other as a trigger for outputting/transmitting reminder messages, the illustrative embodiments are not limited to such. Rather, in other illustrative embodiments, the present location of a wireless communication device relative to locations associated with contact entries may be used, regardless of the current location of the other wireless communication device. For example, if a user of wireless communication device (e.g., smart phone) 110 is currently located at a particular geographical location (as may be determined, for example, from a GPS, RFID system, or other location determination system) and that geographical location is determined to be near a location listed in a contact entry in the contact list database for which a reminder record has been generated and stored, then simply because the smart phone 110 is near a registered location for the contact entry, the reminder record may be output (if a corresponding setting the reminder record has been set accordingly).

For example, a reminder record may include a reminder for Steve, the user of smart phone 110, to return a book he borrowed from Cristina. The reminder record may have a setting set that if Steve's smart phone 110 is detected to be within a geographic mile radius of Cristina's home location, then the reminder should be output on Steve's smart phone 110. Thus, if Steve is traveling along a route that takes him within a mile radius of Cristina's house, the corresponding reminder may be output on Steve's smart phone 110, regardless of whether Cristina's smart phone 112 is currently within the mile radius or not. The determinations of whether Steve's smart phone 110 is within a mile radius of Cristina's home location may be based on geographical location information of the current location of Steve's smart phone 112, and geographical location information associated with any reminder records for which a corresponding setting is set to base reminders on proximity to contact entry locations in addition to, or in place of, proximity to contact entry associated wireless communication devices.

As mentioned above, the determination of the locations of wireless communication devices, such as smart phones 110 and 112, may be performed by many different types of location systems including GPS, RFID systems, and the like. In one illustrative embodiment, the determination of locations of wireless communication devices is performed by an external system that is external to the wireless communication devices. For example, RFID detectors may be present within locations for detecting the presence of persons within a local range of the RFID detectors that have RFID tags associated with them. This is especially useful within structures of an enterprise, such as a business, institution, or other organizations' building, campus, or the like. The RFID tags may be associated with the persons' wireless communication devices, or otherwise associated with the persons through other means, e.g., in a person's badge or other worn article. The detection of the RFID tag in a particular location corresponding to the RFID detector may be communicated to a centralized server, such as server 104, so as to inform the centralized server of the presence of the person at the location. In a similar manner as discussed above with a centralized server approach, the search for, and use of, reminder records at the centralized server may be performed with one additional operation being required. The additional operation is to associate the identity of the person with a wireless communication device associated with the person so that the reminder notifications can be sent to the wireless communication device. Such identification of the wireless communication device may be performed using enterprise wide contact information stored in the server, for example.

Figure 3:
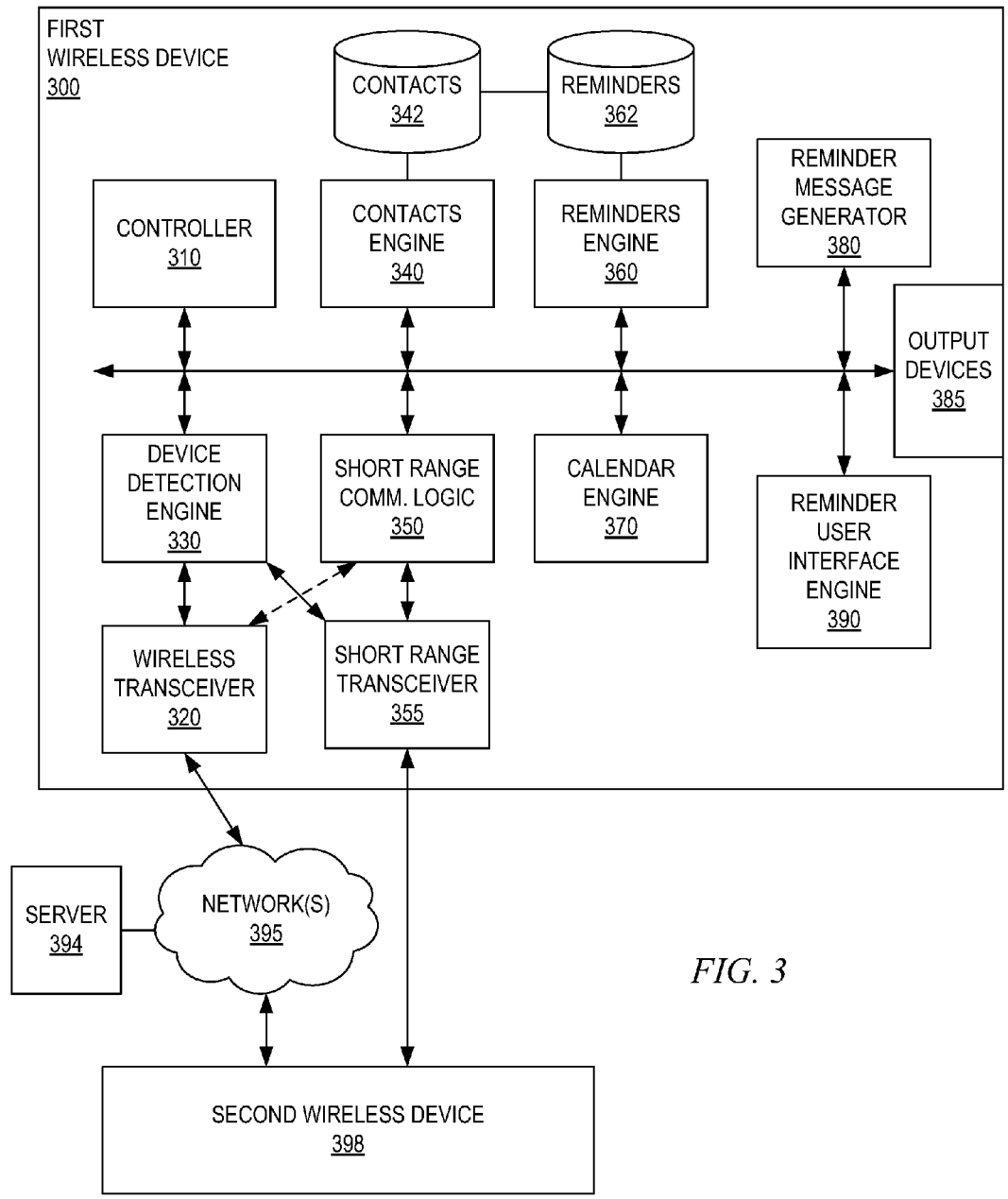
FIG. 3 is an example block diagram illustrating the primary operational elements of wireless devices in accordance with one illustrative embodiment in which reminder mechanisms are distributed amongst the wireless communication devices.

FIG. 3 is an example block diagram illustrating the primary operational elements of wireless devices in accordance with one illustrative embodiment in which reminder mechanisms are distributed amongst the wireless communication devices. For purposes of the example embodiment shown in FIG. 3, it will be assumed that the wireless communication devices 300 and 398 are smart phones, however as noted above the present invention is not limited to such and other types of wireless communication devices which are capable of running software or having hardware logic for implementing the operations and functionality of the illustrative embodiments may be used without departing from the spirit and scope of the present invention. Moreover, the wireless devices 300 and 398 may be, for example, client devices 110-114 in FIG. 1.

Furthermore, the elements shown in FIG. 3 within the wireless communication device 300 may be implemented in hardware, software, or any combination of hardware and software. In one illustrative embodiment, many of the elements shown in FIG. 3 as part of wireless communication device 300 are implemented as software instructions loaded into one or more memories and executed by one or more processors. In other illustrative embodiments, such elements may be partially, or entirely, implemented as hardware logic circuits, such as an Application Specific Integrated Circuit (ASIC) or the like.

As shown in FIG. 3, a first wireless communication device 300 (hereafter referred to as a smart phone 300 to take one example of a wireless communication device), may communicate with other wireless communication devices, such as second wireless communication device 398, and/or wireless network infrastructure computing devices, such as server 394, via one or more wireless, and optionally wired, networks 395. The smart phone 300 may comprise a plurality of elements 310-390 that work together to achieve the functionality of the smart phone 300 including the reminder notification and message transmission operations/functionality of the illustrative embodiments. For illustration purposes, this interaction is depicted by way of the use of a bus based system, however the illustrative embodiments are not limited to a bus system but may utilize any suitable interconnectivity that permits the interaction of elements described herein.

As shown in FIG. 3, the smart phone 300 includes a controller 310, a wireless transceiver 320, a device detection engine 330, a contacts engine 340 with associated contacts database 342, short range communication logic 350, short range transceiver 355, reminders engine 360 with associated reminders database 362, a calendar engine 370, a reminder message generator 380, one or more output devices 385, and a reminder user interface engine 390. Other elements may also be provided in the smart phone 300 which are not depicted for purposes of emphasis of the primary elements used to generate reminder notifications in accordance with the illustrative embodiments.

The controller 310 is responsible for controlling and orchestrating the operations of the other elements 320-390 of the smart phone 300. The wireless transceiver 320 provides a communication pathway for wireless communication to and from the smart phone 300 with the network(s) 395 and/or directly with the second wireless device (or smart phone) 398. That is, the wireless transceiver 320 may be configured only to perform wireless communications via a large area wireless communication network, such as a cellular network or the like, or may have additional functionality to perform short range communications directly with other devices within a short range, i.e. local vicinity, of the smart phone 300, e.g., using Bluetooth, infrared, or other short range communication mechanisms. However, in some illustrative embodiments, a separate short range transceiver 355 may be provided with associated short range communication logic 350 for purposes of communication with other devices within a local vicinity (or short range). This separate short range communication logic 350 and transceiver 355 are shown in FIG. 3 to illustrate this possible implementation but may be integrated with the wireless receiver 320 in some implementations. This is depicted by the dashed line between the short range communication logic 350 and the wireless transceiver 320.

The device detection engine 330 provides the logic for determining if there are other wireless communication devices within the local vicinity (within a short range) of the smart phone 300 based on information received via the wireless transceiver 320 and/or the short range transceiver 355. That is, the device detection engine 330 may receive transmissions from other wireless devices and may determine if these devices are of the type that may be associated with reminder records in accordance with the illustrative embodiments. For example, some devices, such as DVD players, printers, earpieces, or the like, may utilize short range communication mechanisms but are not appropriate for determining whether another person with which a reminder record may be associated is within a short range of the smart phone 300. The device detection engine 330 not only detects the presence of these devices based on signals received via the wireless transceiver 320 and/or short range transceiver 355, but may filter these signals based on device identities received in such signals. The device detection engine 330 may therefore, for purposes of reminder notifications, only register the presence of wireless devices that are of a particular type, e.g., smart phones, cellular phones, tablet computing devices, notebook computers, or the like, that are likely to be associated with the presence of a corresponding user.

In some illustrative embodiments, the short range communication logic 350, short range transceiver 355, and even the integrated capability of short range communication in the wireless transceiver 320 may be eliminated. In such embodiments, the detection of other devices within a local vicinity of the smart phone 300 may be performed using external mechanisms, such as GPS, RFID tag detectors, and the like. In such a case, the presence of other devices and their associated identification information may be received via the network(s) 395 from a centralized server 394, for example. That is, the server 394 may determine the location of smart phone 300 and other devices in the area of smart phone 300 and communicate this information to smart phone 300 via the network(s) 395 and the wireless transceiver 320. The device detection engine 330 may still perform its filtering functionality and provide the resulting filtered device information to the controller 310 for further processing as described hereafter.

The device detection engine 330 provides an output to the controller 310 indicating the presence of other devices and the information received about these devices via the wireless transmissions. The controller 310 may then initiate a search of contact information corresponding to the device identifier information for devices in a local vicinity of the smart phone 300 as filtered by the device detection engine 330. It should be noted that the definition of a "local vicinity" or "short range" is dependent upon either the technology used to detect the presence of the other devices, or user specified parameters at the centralized server 394, or both. For example, there are inherent limitations to range in short range communication mechanisms such as Bluetooth and Infrared communication mechanisms that in themselves define what is a "local vicinity" or "short range" and thus, all that is required is that the devices be detected using these mechanisms with no other determination as to a range to the other devices having to be determined (although it is still possible to do so if desired). However, if such a short range communication mechanism is not utilized, then user specified parameters as to what the user determines to be a "short range" or "local vicinity" may be utilized, and/or default values may be used in the absence of user specified parameters. Thus, for example, the server 394 may have a default parameter of a short range being 1 mile, 500 feet, or the like, as specified by the user and/or as a default.

The controller 310 may provide the device identification information regarding detected devices within the local vicinity to the contacts engine 340 which may then search the contacts database 342 for any contact records having matching device identification information. For example, the device identification information may be a device serial number, username associated with the device, telephone number, or any other identifier that is capable of uniquely identifying the device and/or the registered user of the device. The contact records it the contacts database 342 may store personal information regarding persons known to the user of the smart phone 300 including name, address, telephone numbers, and the like, as is generally known in the art. The contact records may further store device identification information for the wireless devices associated with those persons, such as a wireless telephone number or even device id, for example. Thus, the contacts engine 340 may search the various contacts records in the contacts database 342 to find any contact records having a matching device identification information. Ideally, there should be only one such matching contact record, however this is not required for the mechanisms of the illustrative embodiments to function properly.

If the contacts engine 340 finds a matching contact record in the contacts database 342, the matching contact record may be provided or otherwise identified to the reminders engine 360. The reminders engine 360 may search the reminders database 362 for any matching reminder records that match the contact record. It should be appreciated that the reminders record preferably includes a link or other identifier of a corresponding contact record with which it is associated. Thus, the reminders engine 360 may retrieve any reminder records that are associated with that contact based on this link or identification of the corresponding contact record and the identification of the matching contact record provided by the contacts engine 340.

The reminders engine 360 may provide the retrieved reminder record(s) from the reminders database 362 and provide them to the reminder message generator 380. The reminder message generator 380 may analyze the parameters of the reminder record(s) to determine the type and content of the reminder message(s) to be generated for the reminder notifications to be presented. The reminder message generator 380 may then generate the reminder messages and provide them to the output device(s) 385 for output in the corresponding format for the output device. For example, if the reminder message is a textual and/or graphical message, the reminder message may be formatted for graphical display on a display device of the smart phone 300. If the reminder message is an audible message, or comprises an audible portion (such as an alert sound or the like), then the reminder message, or at least a portion of it, may be formatted for audible output on a speaker of the smart phone 300.

The content of the reminder message may be specified in the reminder record. Moreover, portions of the content of the reminder message may be retrieved from other sources based on settings in the reminder record. For example, the reminder record may specify that a picture of the person associated with the matching contact record be presented in the reminder message, a specific calendar entry or set of calendar entries associated with the matching contact record be presented, or the like. This additional content may be retrieved from the contacts database 342, the calendar engine 370, or any other suitable source of content for the reminder message.

The reminder message generator 380 may not only generate reminder messages to be output on the output devices 385 of the smart phone 300, but may also generate notification messages to be transmitted to the other detected devices, e.g., second wireless device 398, via the network(s) 395 or through short range communications. As with the reminder messages output on the smart phone 300, the content of these messages transmitted to the other devices may also have content selected from other sources, such as contacts database 342 and/or calendar engine 370.

The contacts engine 340 and reminders engine 360 further comprise logic for creating and managing contacts records and reminder records in the databases 342 and 362. The creation and management of contacts records in a wireless communication device is generally known in the art and thus, a detailed explanation is not provided herein. However, in order to facilitate the creation and management of reminder records in the reminders database 362, a reminder user interface engine 390 is provided which may work in concert with the reminders engine 360 to provide a graphical user interface (GUI) through which a user of the smart phone 310 may select contact records and optionally calendar entries to associated with a reminder record, select reminder message parameters, and even provide content for inclusion in the reminder messages generated based on the corresponding reminder record.

Moreover, the controller 310 may monitor for inputs by a user of the smart phone 300 in response to the output of a reminder message on the smart phone 300. As discussed above, a user may be presented with options for responding to the reminder message (or notification) output on the smart phone 300 including such options as "OK", "Snooze", and/or "Postpone," for example. The controller 310 may detect the user's selection of one of these options as an input and instruct the reminders engine 360 to perform appropriate control of the reminder message output and management of the corresponding reminder record. For example, if the "OK" option is selected, the reminders engine 360 may store an indicator that the reminder notification has been acknowledged with no further action to be performed. If the "Snooze" option is selected, the reminder message or notification may be removed but the reminders engine 360 may set a parameter to cause the reminder message or notification to be represented after the elapse of a given interval of time. If the "Postpone" option is selected, the reminder engine 360 may cause the reminder message or notification to be removed with an indication that the reminder notification should be output again at a next time that the second wireless device 398 is again detected within a local vicinity of the smart phone 300.

As mentioned previously, it should be appreciated that while the above description is based on the proximity of two or more wireless communication devices 300 and 398 to each other as a trigger for outputting/transmitting reminder messages, the illustrative embodiments are not limited to such. Rather, in other illustrative embodiments, the present location of a wireless communication device 300 relative to locations associated with contact records in the contacts database 342 may be used, regardless of the current location of the second wireless communication device 398. For example, if a user of smart phone 300 is currently located at a particular geographical location (as may be determined, for example, from a GPS, RFID system, or other location determination system) and that geographical location is determined to be near a location listed in a contact record in the contacts database 342 via a periodic search of the contacts database 342 by the contacts engine 340, for which a reminder record in the reminders database 362 has been generated and stored, then simply because the smart phone 300 is near a registered location for the contact record, e.g. a home or business location for the person corresponding to the contact record, the reminder record may be output (if a corresponding setting the reminder record has been set accordingly).

Figure 4:
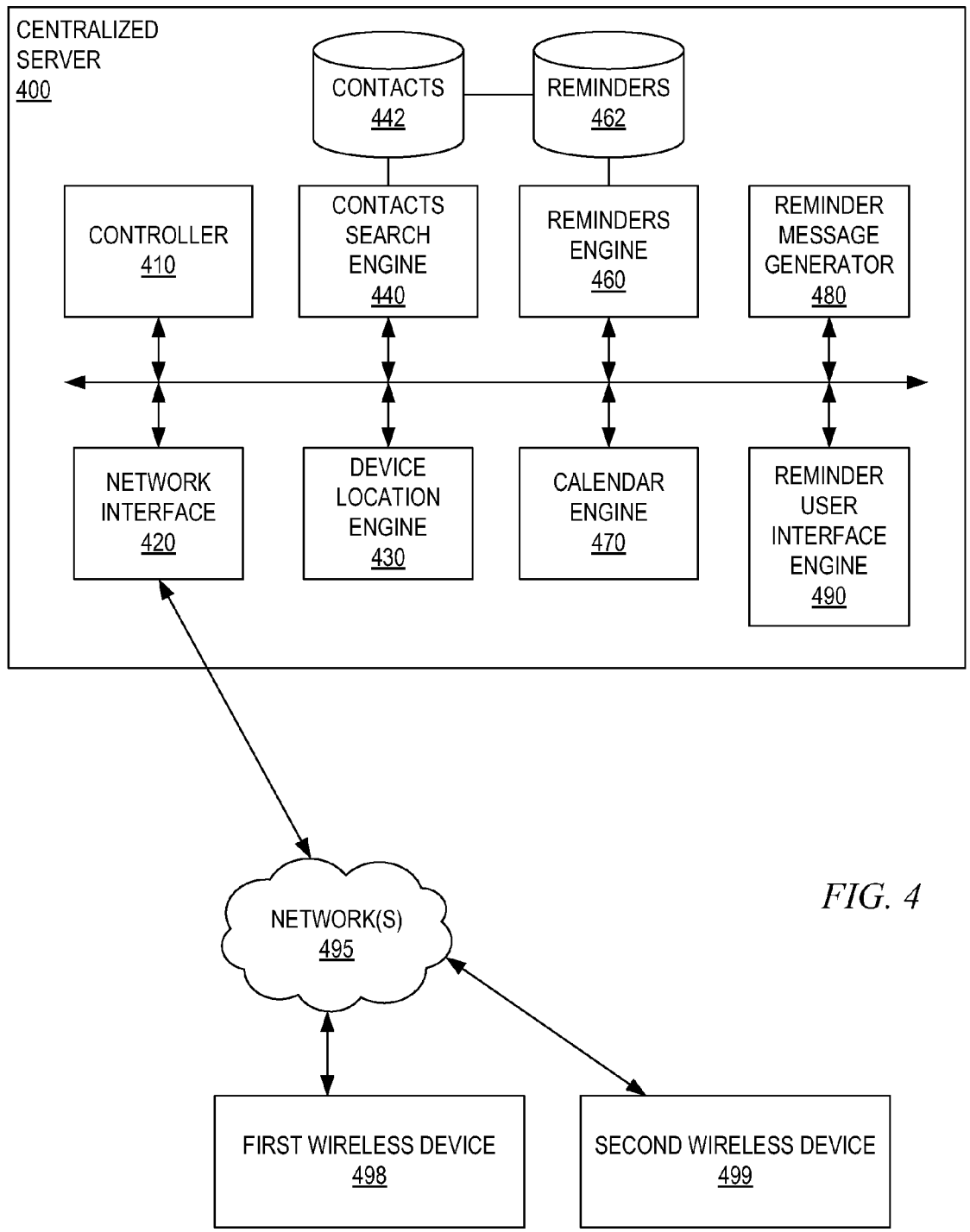
FIG. 4 is an example block diagram illustrating the primary operational elements of a wireless communication system in accordance with one illustrative embodiment in which reminder mechanisms are centralized in a server computing device.

FIG. 4 is an example block diagram illustrating the primary operational elements of a wireless communication system in accordance with one illustrative embodiment in which reminder mechanisms are centralized in a server computing device. As described previously, the determination of what devices are nearby the smart phone 300 may be performed locally by the smart phone 300 or using a more centralized approach through a centralized server, such as server 104 or 106 in FIG. 1, for example. FIG. 4 illustrates one example of such a centralized server approach in which the identification of devices that are local to one another, contacts searching and reminder engine logic, and reminder message generation have been moved from the individual wireless communication devices and provided instead in a centralized server 400.

As shown in FIG. 4, the centralized server 400 is in communication with a plurality of wireless devices 498-499 (e.g., smart phones), via one or more networks 495 which include at least one wireless network for communicating with the wireless devices 498-499. The networks 495 may further include a wired network and the server 400 may be coupled to the networks 495 via a wired or wireless connection. The wireless devices 498 may have local storage of contact records which may be replicated at the centralized server 400, for example, in contacts database 442 in association with an identifier of the user of the wireless device 498-499 and/or identity of the wireless device 498-499. Thus, the contacts database 442 may store contact records for a plurality of different users and/or wireless devices 498-499.

The controller 410 is responsible for controlling the overall operation of the server 400 and for orchestrating the operation of the other elements of the server 400. The network interface 420 provides a communication pathway through which data may be transmitted and received over the networks 495. The device location engine 430 determines the locations of wireless devices 498-499 sending handshake, heartbeat, or other signals to the server 400 via the networks 495.

With this centralized approach, various mechanisms may be used to identify the locations of the wireless communication devices (e.g., smart phones) 498 and 499 including using global positioning systems (GPS), radio frequency identifier (RFID) tag based mechanisms with local detectors and RFID tags associated with users and/or the wireless devices 498-499, cellular triangulation using cellular towers and base stations, or the like. For example, GPS mechanisms in the smart phones 498-499 may be used to report their position to the centralized server 400. This information may be stored and provided to the device location engine 430 which may then determine what devices are within a predetermined geographical distance of each other. The predetermined geographical distance may be a default geographical distance or may be specific to the particular reminder records in the reminders database 462 associated with the smart phone 498-499 the centralized server 104. For example, the default geographical distance may be selected to be a distance that is sufficiently large enough to encompass most reminder records but not too large as to be overly encompassing, e.g., a 1 mile radius. This default may be used to initially identify devices considered to be near each other and then may be further refined based on distance settings indicated in the reminders records associated with the identified devices that are near each other.

Based on the identification of devices that are geographically close to one another, the contacts search engine 440 may retrieve the contact records for these devices and perform a cross correlation to determine which devices have contact records for the other devices that are geographically close to them. Thus, for example, the contact records for smart phone 498 may be retrieved from database 442 and the contact records for smart phone 499 may be retrieved from database 442 and both sets of contact records may be searched to see if a contact record corresponding to the other device 498 or 499 is present in the set of contact records (e.g., a contact record for device 498 in the contact records associated with device 499 and vice versa). Based on a matching contact record being found, similar lookup of reminder records corresponding to the matching contact records and generation of reminder messages may be performed by the reminders engine 460 as previously discussed above with reference to FIG. 3. The reminder messages may be transmitted back to the devices 498-499 via the networks 495. The users of the smart phones 498-499 may interact with the server 400 via the networks 495 to utilize the reminders engine 460, reminder user interface engine 490, and the like, to create and manage reminder records in the reminders database 462 that are associated with the contact records in the contacts database 442 that are associated with the particular user and/or device 498-499. Appropriate logon and security mechanisms may be provided in the server 400 to ensure that one user cannot access or modify the contacts and reminder records of another user.

Thus, the illustrative embodiments provide either a distributed or centralized approach to reminder notification generation for wireless communication devices based on the proximity of the wireless communication devices with each other. The reminder messages are customizable by the users and are keyed to the close proximity of the devices, and thus, the users, rather than being solely based on date/time conditions. The reminder messages may have content specifically provided by the user and/or retrieved from other sources, such as contacts data structures, calendar data structures, and the like. The reminders may be associated with particular contact records/entries in a contacts database for ease of identification of these reminder records.

Figure 5A:
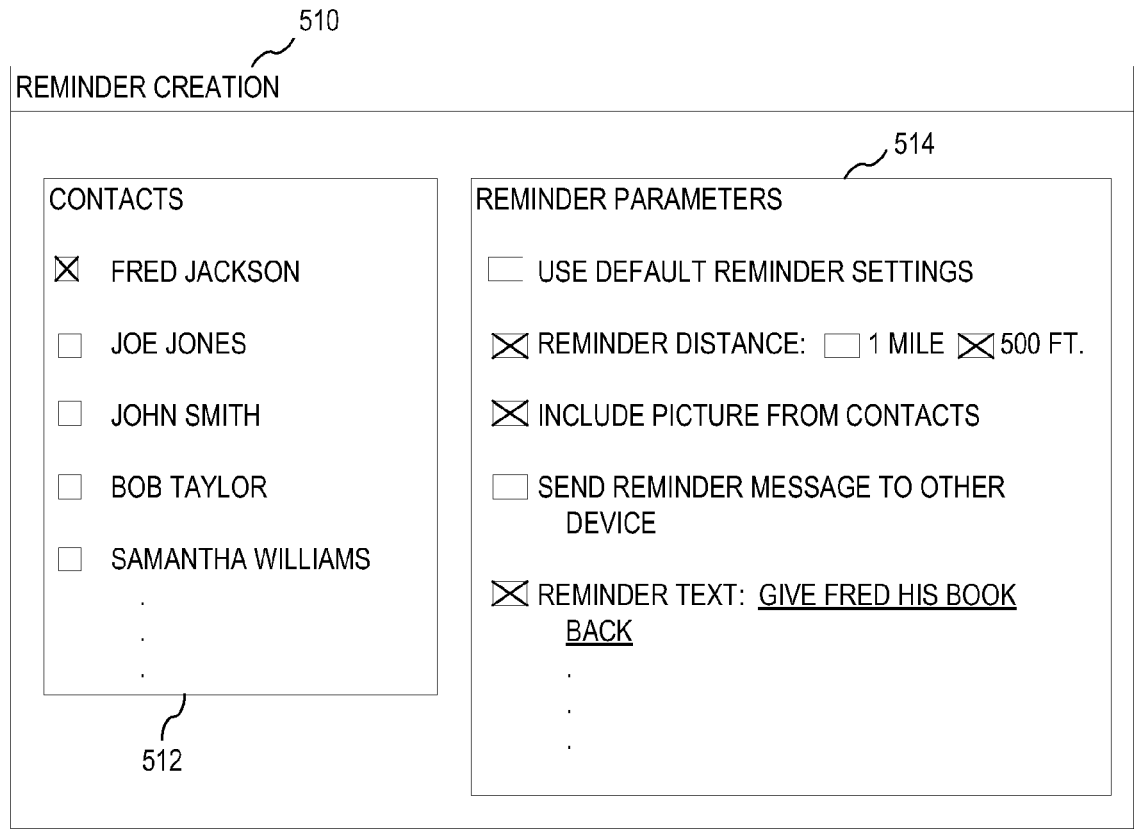
FIG. 5A is an example diagram of a user interface for specifying characteristics of a reminder record in accordance with one illustrative embodiment.

FIG. 5A is an example diagram of a user interface for specifying characteristics of a reminder record in accordance with one illustrative embodiment. As shown in FIG. 5A, the user interface 510 comprises a contacts selection interface portion 512 and a reminder parameters selection and input portion 514. In the contacts selection interface portion 512 the user is given a listing of the contacts records associated with, or stored in, the wireless communication device from which the use may select those for which the reminder record that is being created should be associated. Thus, for example, a user may, via a user input device such as a touch screen or the like, select one or more contact record identifiers from the listing in the portion 512, e.g., "Fred Jackson" in the depicted example.

In the reminder parameters selection and input portion 514, various reminder parameters may be presented for selection by the user using the touch screen or other user input device. Moreover, fields may be provided for the user to enter particular settings for parameters, such as by specifying ranges or distances, particular text for reminder messages, and the like. In the depicted example, various reminder parameters are provided, such as "use default reminder settings," selecting a reminder distance to specify the distance in which the other devices should be detected in order to cause a reminder to be output, a parameter for selecting whether to include a picture from contacts when presenting the reminder message, an option for sending a reminder message to the other detected device, and an parameter for specifying the text of the reminder message.

The user may select the contacts and the reminder parameters using these portions 512 and 514 to cause a reminder record to be generated identifying the selected parameters, specified text, and the like, and associating the reminder record with the selected contact record(s). Many different reminder options may be presented including those depicted and others that allow for selection of other sources of content to be used to include additional content in the reminder messages, the selection of audible alerts, and the like. The resulting reminder records may be stored in a reminder database as previously described for use in determining if, when, and how to present reminder messages to a user of a wireless communication device based on the proximity of other wireless communication devices associated with other persons with whom reminder records are associated.

Figure 5B:
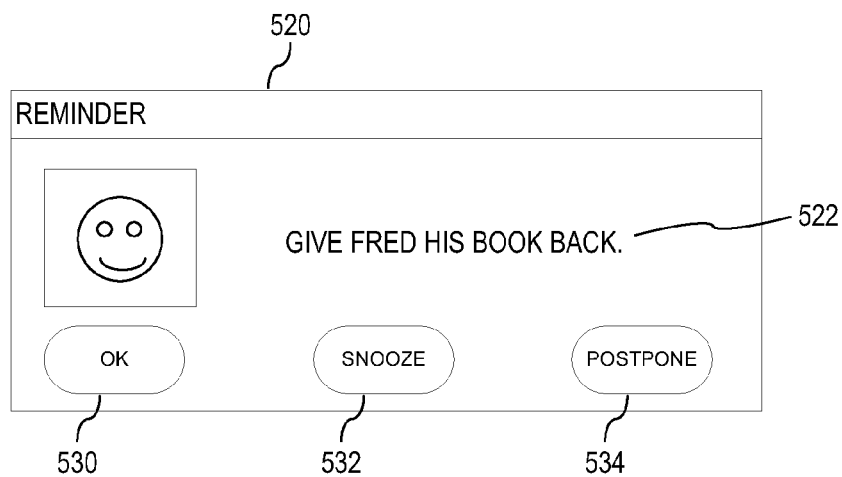
FIG. 5B is an example diagram of a reminder message that may be output on a wireless communication device in accordance with one illustrative embodiment.

FIG. 5B is an example diagram of a reminder message that may be output on a wireless communication device in accordance with one illustrative embodiment. As shown in FIG. 5B, the reminder message 520 may comprise reminder content 522 which may include text and images (such as an image associated with a contact record or the like). The content 522 may further include content from other sources, such as a calendar application or the like. The reminder message 520 may further comprise one or more options 530-534 for a user to respond to the output of the reminder message 520, such as "OK", "Snooze", or "Postpone" as previously discussed above.

Figure 6:
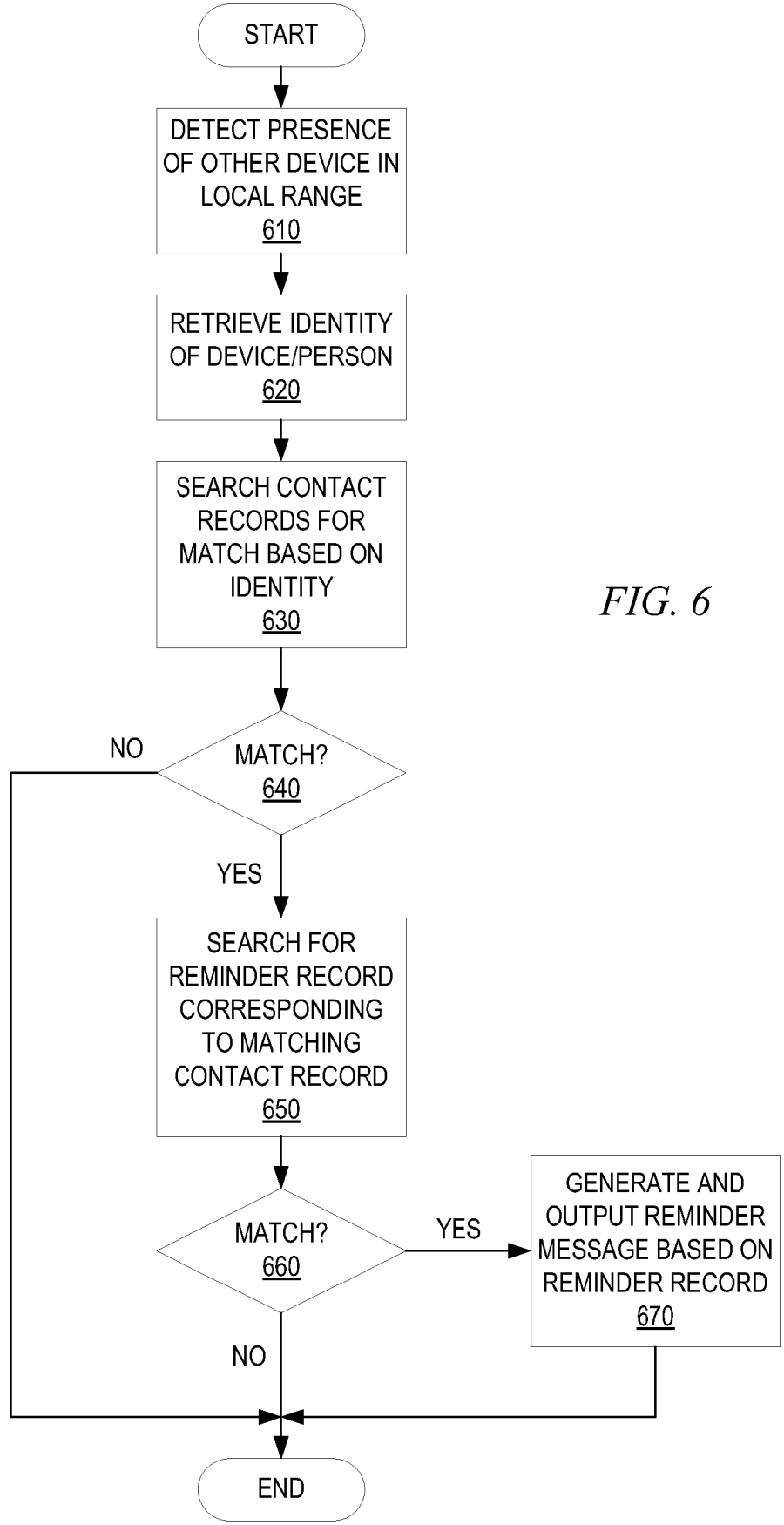
FIG. 6 is a flowchart outlining an example operation for presenting a reminder notification in accordance with one illustrative embodiment.

FIG. 6 is a flowchart outlining an example operation for presenting a reminder notification in accordance with one illustrative embodiment. The operation outlined in FIG. 6 may be implemented, for example, by a reminder engine of a wireless communication device or centralized server, for example.

As shown in FIG. 6, the operation starts by detecting the presence of another device or identifier device (such as an RFID tag) associated with a person being within a local range of the device associated with the reminder engine (step 610). The identity of the device or person is retrieved based on the wireless signals, RFID tag information, or the like, received (step 620). The identity is used as a basis for performing a search of contact records associated with the reminder engine that have a matching device identifier associated with them (step 630). A determination is made as to whether there is a matching contact record or not (step 640). If a matching contact record is not found, then the operation terminates. If a matching contact record is found, then a search is performed of reminder records to determine if there are any reminder records corresponding to the matching contact record (step 650). A determination is made as to whether there is a matching reminder record that matches the matching contact record (step 660). If there is a reminder record associated with the matching contact record, then the reminder message(s) are generated and output (step 670). The operation then terminates.

Thus, the illustrative embodiments provide mechanisms for generating reminder messages in response to the detection of a device or other identifier associated with a person being in a local proximity of a wireless communication device. Thus, reminders are made possible based on the physical presence of users (as determined by the devices that they carry), rather than being based on date/time settings in calendar entries.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a first wireless communication device, for generating a first reminder notification on the first wireless communication device and transmitting an instruction to a second wireless communication device to output a second reminder notification on the second wireless communication device, comprising:
   detecting, by the first wireless communication device, a physical presence of the second wireless communication device within a physical local range of the first wireless communication device; and
   in response to detecting the physical presence of the second wireless communication device within the physical local range of the first wireless communication device:
      determining, by the first wireless communication device, an identity associated with the second wireless communication device;
      determining, by the first wireless communication device, if a reminder record is stored in the first wireless communication device in association with the identity associated with the second wireless communication device; and
      in response to a reminder record being stored in the first wireless communication device in association with the identity associated with the second wireless communication device:
         instructing the first wireless communication device to generate and output a reminder notification on the first wireless communication device based on content of the reminder record; and
         transmitting, by the first wireless communication device, an instruction to the second wireless communication device to generate and output, on the second wireless communication device, a second reminder notification based on the content of the reminder record.

2. The method of claim 1, wherein detecting a physical presence of the second wireless communication device within a physical local range of the first wireless communication device comprises using a short range communication mechanism to perform direct communication between the first wireless communication device and the second wireless communication device to thereby detect the physical presence of the second wireless communication device within the physical local range.

3. The method of claim 1, wherein detecting a physical presence of second wireless communication device within a physical local range of the first wireless communication device comprises utilizing a centralized server and a large scale positioning system associated with the centralized server to identify a location of the first wireless communication device and a location of the second wireless communication device, and to compare the locations of the first wireless communication device and the second wireless communication device to determine whether the second wireless communication device is within the physical local range of the first wireless communication device.

4. The method of claim 1, wherein instructing the first wireless communication device to generate and output a reminder notification on the first wireless communication device based on content of the reminder record further comprises:
   interfacing with an electronic calendar data structure associated with the first wireless communication device, wherein the electronic calendar data structure is associated with an electronic calendar application of the first wireless communication device and is separate and distinct from the reminder record, and wherein the electronic calendar data structure stores event information independently of reminder records;
   retrieving event information associated with a user of the second wireless communication device from the electronic calendar data structure; and
   generating the reminder notification based on the retrieved event information.

5. The method of claim 1, wherein the reminder record specifies one or more characteristics of the reminder notification, wherein the one or more characteristics comprise at least one of:
   a textual message to include as part of the reminder notification,
   an indicator of whether the reminder notification is to be a textual, graphical, audible, or tactile reminder notification,
   a frequency of repetition of the reminder notification,
   a volume level of the reminder notification,
   a designation of an audible sound or audible output to generate as part of the reminder notification, or
   an indicator of whether a picture of a user with which the reminder record is associated is to be output as part of the reminder notification, and wherein the reminder record further specifies an indication of whether or not to send an instruction to the second wireless communication device to instruct the second wireless communication device to output the second reminder notification on the second wireless communication device in response to detecting the second wireless communication device being within the local range of the first wireless communication device.

6. The method of claim 1, wherein:
   determining an identity associated with the second wireless communication device comprises performing a lookup operation in a contacts listing data structure, of the first wireless communication device, the contacts list data structure being associated with a communications application providing logic for communicating with other devices, the lookup operation being based on the identifier associated with the second wireless communication device, to identify a matching contact entry corresponding to the identifier of the second wireless communication device,
   reminder records in a reminder records data structure associated with the first wireless communication device are linked to entries in the contacts listing data structure, and
   determining if a reminder record is stored in association with the identity associated with the second wireless communication device comprises performing a lookup operation in the reminder records data structure based on the matching contact entry to determine if there is a matching reminder record associated with the matching contact entry.

7. The method of claim 1, wherein the reminder notification comprises user selectable elements for responding to the reminder notification, and wherein, in response to a user selection of a user selectable element, the output of the reminder notification is modified, and wherein the user selectable elements comprises a postpone user selectable element that schedules the reminder notification to be re-presented on the first wireless communication device at a next instance of the first wireless communication device coming into physical proximity with the second wireless communication device.

8. A computer program product comprising a non-transitory computer readable medium having a computer readable program stored therein, wherein the computer readable program, when executed on a first wireless communication device, causes the first wireless communication device to:
  detect a physical presence of a second wireless communication device within a physical local range of the first wireless communication device; and
  further causes the first wireless communication device, in response to detecting the physical presence of the second wireless communication device within the physical local range of the first wireless communication device, to:
    determine an identity associated with the second wireless communication device;
    determine if a reminder record is stored in the first wireless communication device in association with the identity associated with the second wireless communication device; and
    in response to a reminder record being stored in the first wireless communication device in association with the identity associated with the second wireless communication device:
      generate and output a reminder notification on the first wireless communication device based on content of the reminder record; and
      transmit an instruction to the second wireless communication device to generate and output, on the second wireless communication device, a second reminder notification based on the content of the reminder record.

9. The computer program product of claim 8, wherein the computer readable program further causes the first wireless communication device to detect a physical presence of the second wireless communication device within a physical local range of the first wireless communication device using a short range communication mechanism to perform direct communication between the first wireless communication device and the second wireless communication device to thereby detect the physical presence of the second wireless communication device within the physical local range.

10. The computer program product of claim 8, wherein the computer readable program further causes the first wireless communication device to detect a physical presence of the second wireless communication device within a physical local range of the first wireless communication device utilizing a centralized server and a large scale positioning system associated with the centralized server to identify a location of the first wireless communication device and a location of the second wireless communication device, and to compare the locations of the first wireless communication device and the second wireless communication device to determine whether the second wireless communication device is within the physical local range of the first wireless communication device.

11. The computer program product of claim 8, wherein the computer readable program further causes the first wireless communication device to instruct the second wireless communication device to generate and output a reminder notification on the second wireless communication device based on content of the reminder record further at least by:
  interfacing with an electronic calendar data structure associated with the first wireless communication device, wherein the electronic calendar data structure is associated with an electronic calendar application of the first wireless communication device and is separate and distinct from the reminder record, and wherein the electronic calendar data structure stores event information independently of reminder records;
  retrieving event information associated with a user of the second wireless communication device from the electronic calendar data structure; and
  generating the reminder notification based on the retrieved event information.

12. The computer program product of claim 8, wherein the reminder record specifies one or more characteristics of the reminder notification, wherein the one or more characteristics comprise at least one of:
  a textual message to include as part of the reminder notification,
  an indicator of whether the reminder notification is to be a textual, graphical, audible, or tactile reminder notification,
  a frequency of repetition of the reminder notification,
  a volume level of the reminder notification,
  a designation of an audible sound or audible output to generate as part of the reminder notification, or
  an indicator of whether a picture of a user with which the reminder record is associated is to be output as part of the reminder notification, and wherein the reminder record further specifies an indication of whether or not to send an instruction to the second wireless communication device to instruct the second wireless communication device to output the second reminder notification on the second wireless communication device in response to detecting the second wireless communication device being within the local range of the first wireless communication device.

13. The computer program product of claim 8, wherein:
  determining an identity associated with the second wireless communication device comprises performing a lookup operation in a contacts listing data structure, of the first wireless communication device, the contacts list data structure being associated with a communications application providing logic for communicating with other devices, the lookup operation being based on the identifier associated with the second wireless communication device, to identify a matching contact entry corresponding to the identifier of the second wireless communication device,
  reminder records in a reminder records data structure associated with the first wireless communication device are linked to entries in the contacts listing data structure, and
  determining if a reminder record is stored in association with the identity associated with the second wireless communication device comprises performing a lookup operation in the reminder records data structure based on the matching contact entry to determine if there is a matching reminder record associated with the matching contact entry.

14. The computer program product of claim 8, wherein the reminder notification comprises user selectable elements for responding to the reminder notification, and wherein, in response to a user selection of a user selectable element, the output of the reminder notification is modified, and wherein the user selectable elements comprises a postpone user selectable element that schedules the reminder notification to be re-presented on the first wireless communication device at a next instance of the first wireless communication device coming into physical proximity with the second wireless communication device.

15. A data processing system that is a first wireless communication device, comprising:
- a processor; and
- a memory coupled to the processor, wherein the memory comprises instructions which, when executed by the processor, cause the processor to:
- detect a physical presence of a second wireless communication device within a physical local range of the first wireless communication device; and
- further causes the first wireless communication device, in response to detecting the physical presence of the second wireless communication device within the physical local range of the first wireless communication device, to:
- determine an identity associated with the second wireless communication device;
- determine if a reminder record is stored in the first wireless communication device in association with the identity associated with the second wireless communication device; and
- in response to a reminder record being stored in the first wireless communication device in association with the identity associated with the second wireless communication device:
  - generate and output a reminder notification on the first wireless communication device based on content of the reminder record; and
  - transmit an instruction to the second wireless communication device to generate and output, on the second wireless communication device, a second reminder notification based on the content of the reminder record.

16. The method of claim 6, wherein the communications application is an electronic mail application installed on, and executable by, the first wireless communication device.

17. The method of claim 1, wherein the reminder record comprises a plurality of characteristic parameters specifying a manner by which the reminder notification is to be generated, and wherein the plurality of characteristic parameters comprises a parameter indicating whether or not to output a picture of a user of the other device as part of the reminder notification.

18. The method of claim 1, wherein the reminder notification comprises a user selectable element for transmitting the instruction to the second wireless communication device to cause the second wireless communication device to generate and output the second reminder notification, and wherein the transmitting of the instruction to the second wireless communication device is performed in response to a user of the wireless communication device selecting the user selectable element for transmitting the instruction to the second wireless communication device.

19. The computer program product of claim 8, wherein the communications application is an electronic mail application installed on, and executable by, the first wireless communication device.

20. The method of claim 1, further comprising:
- determining, by the first wireless communication device, a current geographical location of the first wireless communication device;
- performing, by the first wireless communication device, a lookup operation, in a contacts listing data structure associated with the first wireless communication device, based on the current geographical location of the first wireless communication device and identifiers of contacts associated with reminder records stored in the first wireless communication device, to identify contact entries in the contacts listing data structure that have previously registered static geographical location information within a given range of the current geographical location of the first wireless communication device; and
- outputting, by the first wireless communication device, one or more notification outputs corresponding to reminder records whose associated identifiers of contacts correspond to contact entries having previously registered static geographical location information within a given range of the current geographical location of the first wireless communication device.

21. The method of claim 1, wherein the instruction is transmitted directly from the first wireless communication device to the second wireless communication device.

22. The method of claim 1, wherein reminder record is stored on the first wireless communication device and is not stored on the second wireless communication device, and wherein content of the a second reminder notification is specified by the reminder record stored on the first wireless communication device.

* * * * *